UNITED STATES PATENT OFFICE.

ERIK W. ENEQUIST, OF BROOKLYN, NEW YORK.

GLASS AND METHOD OF MAKING THE SAME.

1,403,752.   Specification of Letters Patent.   Patented Jan. 17, 1922.

No Drawing.   Application filed November 24, 1920.   Serial No. 426,120.

*To all whom it may concern:*

Be it known that I, ERIK W. ENEQUIST, a citizen of the United States, residing at Brooklyn, in the county of Kings and State of New York, have invented certain new and useful Improvements in Glass and Methods of Making the Same, of which the following is a specification.

This invention relates to improvements in glass and method of making the same and allied vitreous substances or bodies such as enamels, glazes, terra cotta, tiles, and bricks, an object of the invention being to provide an improved method of making such substances whereby the strength, temper, or appearance thereof, will be materially improved.

Another object of the invention is to provide an improved method for the manufacture of black soda glass, or various forms of colored, or slightly colored glass, wherein the principal alkali is soda, although the method is not necessarily confined to this particular character of glass.

Another object of this invention is to provide an improved method for the manufacture of glass, and other vitreous substances, hereinbefore mentioned in part, wherein economy of time, material, and fuel is obtained through the utilization of slags, such as basic soda slag, resulting ordinarily as waste in certain blast furnace, smelting, or metallurgical operations.

Other objects of this invention will appear from a perusal and consideration of the ensuing detailed description.

In certain furnace operations, sodium sulphates or bi-sulphates, are used in connection with a reducing agent, such as coke, coal, etc., with or without an addition of common salt, (sodium chloride) with the result that, a sodium sulphide is formed which in turn gives off part of its sulphur to the various metals present, forming metallic matte, or sulphide; and the soda combines with the silica contained in the ore. or by the addition of sand, thus forming a basic soda slag which is drawn off from time to time in a liquid form. This slag contains a large proportion of basic sodium silicate, as for example, about 20–40% of soda, Na2O, combines with 30% to 50% of silica during the furnace operation.

The slag thus obtained contains most of the iron present in the ores as an impurity, such as ferrous silicate. Besides iron, the slag contains a varying percentage of alumina, derived usually from the furnace lining. The slag also contains other impurities found in the original ores, as for instance in silver, copper, nickel and cobalt ores, or impurities contained as ingredients of the furnace lining or of the bricks used to hold the charges.

This basic soda slag has the property of further combining with its own weight, or greater weight of sand or silica and other glass-making materials, thus forming a workable glass after being properly manipulated as is customary in the glass-making industry. The glass thus produced is jet black in appearance and effect, as the ferrous iron in combination with minutely distributed carbon imparts an intense dusky green color to the glass, which in effect is black.

There are many uses for this black glass, such as for polished table tops, wainscoting, etc., and also for fruit jars, fruit jar tops, photographic developing trays, door knobs, ornaments, buttons of various descriptions, bases for lamps, bottles, packers' jars where the exclusion of light is desirable, and for insulators of various description, etc.

Heretofore, black glass has been made by additions of large quantities of manganese to soda ash and sand, which method, while producing a satisfactory black glass, is more than twice as expensive as my improved method whereby I am able to produce a black glass at a minimum of expense, not only as regards economy in the use of ingredients, but also as regards economy in fuel consumption in the melting process.

In general, in my improved method of making glass and its allied products, I utilize certain kinds of slags, preferably basic soda slags, either by adding to the same sand, or siliceous bodies, and other glass making materials; or by adding such slags to raw clay products where the powdered slag serves to impart a darker shade, as for instance in terra cotta after being fired in kilns; or I may add such slags in a granulated form, or as a coarse powder, to raw clay products prepared for the manufacture of face bricks, tiles, etc., which upon being fired, cause the slag to fuse, and thus impart throughout the body, or on the surface, small black specks or mottles desirable in the finished brick, tile or terra cotta.

Heretofore, in the enamel industry, where a double coated ware has been made, the first coat consisted in a frit rich in cobalt or nickel or iron with alumina and borax or boric acid. But in my improved method the frit may be replaced, under certain conditions by a frit comprising basic soda slag, with the addition thereto of cobalt and borax or boric acid. On such articles as radiators, stoves, etc., the basic soda slags may serve as a raw material for making a black surface enamel.

It will be seen that such basic soda slag, containing thirty per cent of soda, for instance, has an alkaline value of about fifty per cent compared with the usual soda ash employed in the glass industry. Hence, my improved method is considerably cheaper than the usual method of making glass.

In carrying out my process, I add to a basic furnace slag, rich in soda, a certain proportion of siliceous material, as sand, and certain amounts of carbonates of calcium, barium, magnesium, iron, etc., which upon being fused with the slag and silica, give off carbonic acid in the process of fusion. Hence, it will not be necessary to use a sodium carbonate in the batch in order to provide the required carbonic acid, except in cases where a light colored glass is essential. When fused the alkali in the slag combines with an added quantity of sand, or silica, while part of the silica in turn combines with the bases in the employed carbonates. In order to lower the fusion point of the glass, I preferably use several carbonates, particularly siderite and witherite—iron carbonate and barium carbonate respectively—while I may add manganese, in the form of manganese oxide, and magnesium carbonate as dolomite. The addition of manganese tends not only to lower the fusion point but also to give strength to a black glass.

It will be observed therefore that in order to make a jet black glass, I may add siderite, or other iron compounds, such as hematite. However, I can make such glass without adding siderite or other iron compounds inasmuch as a percentage, such as five per cent, of ferrous silicate in the finished glass is enough to produce the desired dark color. The basic soda slag generally contains six to ten per cent ferrous oxide which, therefore, is enough for such purpose.

Certain basic furnace slags are rich in lime and such slags may be mixed with a basic soda slag together with sand, carbonates, or fluorides, or common salt, and then fused, thus producing a black workable glass.

By a workable glass I mean a glass that can be blown, pressed or rolled, or otherwise manipulated by well known methods. These slags generally contain a large quantity of alumina, and the presence of alumina in the glass is quite desirable as it tends to make a glass of great strength and high viscosity, although, of course, the presence of the alumina is not an absolute necessity.

Basic soda slag may be fused with boric acid or borax, thus making a black enamel or glaze. Or in a diluted form it may be used as a green glaze for brick, etc., enamel, or glazes in general.

When I desire to manufacture a glass of comparatively clear or transparent quality, I first treat the basic soda slag, at the time it is drawn from the furnace and is still in a molten condition, with such substances as sodium nitrate and arsenious acid or arsenic and then reheat the charge. By this treatment the ferrous compounds, such as ferrous silicate, are oxidized to ferric condition, and thus the greenish color of the first is changed to a yellowish color. At this stage the batch is suitable as a basis for amber glass, or it may be advantageously used as a part ingredient of a common green glass batch.

In order to obtain a transparent glass, and at the same time instead of oxidizing the basic soda glass at the time of obtaining the same at the furnace when in a molten condition, I may add my glass batch comprising approximately 100 parts of basic soda slag, 100 to 150 parts of sand, and 5 to 25 parts of limestone or dolomite, or 10 to 40 parts of barium carbonate to a quantity of the usual batch used for making flint glass together with a quantity of flint cullet, and a quantity of sodium nitrate and arsenious acid or arsenic acid. This mixture I then fuse in the usual manner together with a decolorizing agent such as metallic selenium or selenium compound or manganese, or other decolorizing agent in such proportions that the resulting glass can be worked or manipulated readily.

As hereinbefore pointed out, in the manufacture of dark or very black glass in accordance with my improved process, it will be observed that I combine in general certain quantities of furnace slag, preferably rich in soda, siliceous materials, and various carbonates. Thus, for example, by combining 100 parts of slag with 100 to 150 parts of siliceous material, such as sand, and 5 to 25 parts of siderite or other carbonate, and then fusing the mixture, a black glass may be obtained due to the presence of ferrous compounds, such as ferrous silicate, as hereinbefore described.

In the making of various kinds of inexpensive glass such as jars or bottles, or allied vitreous bodies, preferably where soda is the principal alkali, I may add to my glass batch a certain proportion of lithia and potassa-bearing minerals, such as lepidolite. The action of lepidolite serves as a flux for the batch. In making certain special glasses I use borax or boracic acid with the basic alkali slag, and if desirable, a quantity of metallic oxides may be added thereto in order to produce various color effects and strength. In other cases, I have used as ingredients of the basic glass batch: (1) basic soda slag and soda ash with or without cullet, or broken glass; (2) basic soda slag and fluorspar with or without feldspar; (3) basic soda slag and a siliceous body with or without sodium chlorides, or salt; (4) basic soda slag, sand, fluorspar, with or without feldspar; (5) basic soda slag combined with basic lime slag, or alkaline earth slag, and a carbonate.

I have found that my batch fuses easily at a temperature of 2300 degrees F., but by substituting barium or iron carbonate for a portion of the calcium carbonate, I can make a finished workable glass at a temperature of 2100 degrees F. Furthermore I have found that another important advantage of my method resides in the saving of fuel, inasmuch as basic soda slag, being a frit, when used, fuses again with a minimum amount of additional fuel. This saving, over present methods, amounts to more than one-third. It is of course a well known fact that in the fusion of ordinary glass batches, the fusion loss is some twenty per cent of the weight of the batch, whereas in my process the fusion loss is considerably less, a fact which obviously accounts per se for the saving of fuel. My process, therefore, saves considerable time, as the batch will fuse completely in two-thirds of the time required for the making of ordinary glass, which means that a tank capable of producing thirty tons of ordinary glass in twenty-four hours, will produce forty-five tons of workable glass in twenty-four hours in accordance with my method.

Basic soda slag is particularly useful and advantageous in the production of green glass wherein a copper oxide or chrome oxide, or a bi-chromate is added to the batch, which glass is well adapted as a casing on other glass, such as an opal glass, and when brown, will produce the well known green exterior effect on lamp reflectors. Such glasses are also known as double dipped.

To a batch of dark green or black glass produced as above described may be added cuprous or cupric oxide, or other copper compounds with a reducing agent such as iron scales, or fittings, (chrome green iron) or other reducing agents, and when melted and cased, or double dipped, the ware produced may subsequently be flashed in a glory hole, thus producing a beautiful red color effect. This is known as copper ruby, and often takes the place of gold or selenium. Flashed copper ruby has heretofore largely been imported by this country, usually in the form of flashed sheet glass.

It will be seen therefore, that in making a colored glass, I may use in a single large batch several kinds of furnace slag, such as boric soda and lime slags having varying percentages of alumina and iron. Sodium sulphate with or without sodium carbonate may advantageously be added along with the usual glass making materials, such as sand, limestone, cullet, salt, nitre, fluorspar, feldspar, manganese, borax or boric acid. If the quantity of sulphate is relatively large, a reducing agent, such as carbon or coal dust can be utilized. As hereinbefore stated, a number of carbonates may also be used, such as barium, magnesium, iron, etc., and other ingredients, such as compounds of copper, arsenic, etc., and a lithia bearing ore, according to the color, strength, temper or appearance of the glass desired.

The term "glass" as herein employed, is intended to cover any vitreous body, such as enamel, or glaze, and such allied or analogous substances or materials, inasmuch as enamels and glazes are a form of glass. All of these may be efficaciously made by my improved method.

It is understood that I do not limit myself to the exact proportions herein specified, as such proportions are given by way of example and illustration as having been found to be practicable and effective in carrying out my improved method of making glass, enamels, glazes, terra cotta, tiles, bricks, and the like.

I claim as my invention:

1. As an article of manufacture, glass made from material including basic soda slag.

2. As an article of manufacture, glass made from basic soda slag, and a siliceous material.

3. The method of making glass, which consists in making a glass batch from basic slag and glass making materials.

4. The method of making glass, which consists in making a glass batch from basic soda slag and glass making materials.

5. The method of making a glass having a black effect, which consists in fusing a quantity of basic soda slag with a quantity of glass making materials.

6. The method of making a substantially black glass which consists in fusing a quantity of basic slag with a quantity of glass making materials including a siliceous body and limestone.

7. The method of making a substantially black glass which consists in fusing a quantity of basic soda slag with a quantity of glass making materials including a siliceous body and limestone.

8. The method of making a substantially green glass having a black effect which consists in adding to a batch of glass making materials, including basic soda slag, limestone, and then fusing the mixture.

9. The method of making glass, which consists in adding to a quantity of basic soda slag, glass making materials comprising cullet, and then fusing the batch.

10. The method of making glass, which consists in adding to a glass batch, basic soda slag, siliceous material, and glass making materials comprising calcium carbonate and cullet, and then fusing the mixture.

11. The method of making a workable glass which consists in fusing a basic soda slag with glass making materials including a quantity of siliceous material and calcium carbonate.

12. As an article of manufacture, glass made from a fused batch comprising basic soda slag, and a quantity of glass making materials including cullet.

13. The method of making glass, which consists in combining basic soda slag and a siliceous body, thereby to produce an improved glass.

14. The method of making a vitreous body which consists in mixing a batch comprising basic soda slag, other glass making materials comprising sand and cullet, and then fusing the batch, thereby to produce an improved vitreous product.

15. As an article of manufacture a dark colored glass having a substantially black effect and made from a batch including slag and glass making materials.

16. As an article of manufacture a dark colored glass having a substantially black effect and made from a batch including basic soda slag and glass making materials.

17. As an article of manufacture glass having a dark colored effect and made from a batch including basic slag, siliceous material and limestone.

18. As an article of manufacture a substantially green glass having a black effect and made from a batch of glass making materials including basic soda slag and limestone.

19. As an article of manufacture, glass made from a batch including basic soda slag, siliceous material and other glass making materials including calcium carbonate and cullet.

20. As an article of manufacture a workable glass formed from a batch including basic soda slag and glass making materials comprising a quantity of siliceous material and calcium carbonate.

21. As an article of manufacture an improved glass, made from a batch including basic soda slag and a siliceous body.

Signed at 1822 Park Row Building, New York city, New York, this 20th day of November, 1920.

ERIK W. ENEQUIST.